United States Patent [19]
Bell

[11] Patent Number: 5,581,932
[45] Date of Patent: Dec. 10, 1996

[54] RADIO-CONTROLLED TROLLING VESSEL

[76] Inventor: Stanley Bell, 28982 WCR 15, Windsor, Colo. 80550

[21] Appl. No.: 410,837

[22] Filed: Mar. 27, 1995

[51] Int. Cl.⁶ .................................................. A01K 97/00
[52] U.S. Cl. ............................ 43/26.1; 446/154; 446/160
[58] Field of Search .................................. 43/26.1, 4, 19; 446/154, 160, 163, 164

[56] References Cited

U.S. PATENT DOCUMENTS

| | | | |
|---|---|---|---|
| 3,599,370 | 8/1971 | Armata | 43/26.1 |
| 3,613,284 | 10/1971 | Anderson | 43/26.1 |
| 3,793,761 | 2/1974 | Bonham | 446/154 |
| 3,911,609 | 10/1975 | Baya | 43/26.1 |
| 4,161,077 | 7/1979 | Ciaccio et al. | 43/26.1 |
| 4,339,888 | 7/1982 | Sheng-Jung | 43/26.1 |
| 4,376,350 | 3/1983 | Bednarz et al. | 43/26.1 |
| 4,442,621 | 4/1984 | Kent | 43/26.1 |
| 4,890,409 | 1/1990 | Morgan et al. | 43/26.1 |
| 5,154,016 | 10/1992 | Fedora et al. | 43/26.1 |
| 5,165,193 | 11/1992 | Dankwardt | 43/26.1 |
| 5,363,587 | 11/1994 | Nordling | 43/26.1 |

FOREIGN PATENT DOCUMENTS

| | | | |
|---|---|---|---|
| 5-095750 | 4/1993 | Japan | 43/26.1 |

*Primary Examiner*—J. Elpel
*Attorney, Agent, or Firm*—Dean P. Edmundson

[57] ABSTRACT

A radio-controlled trolling vessel for supporting a fishing reel and line. The vessel is a pontoon-type having good stability. All operations are controlled from a remote location (e.g., on shore) by the operator. The vessel can be powered by an electric motor or gas engine, or both. A cutter or knife can be included on the vessel for cutting the line if it should become snagged.

10 Claims, 3 Drawing Sheets

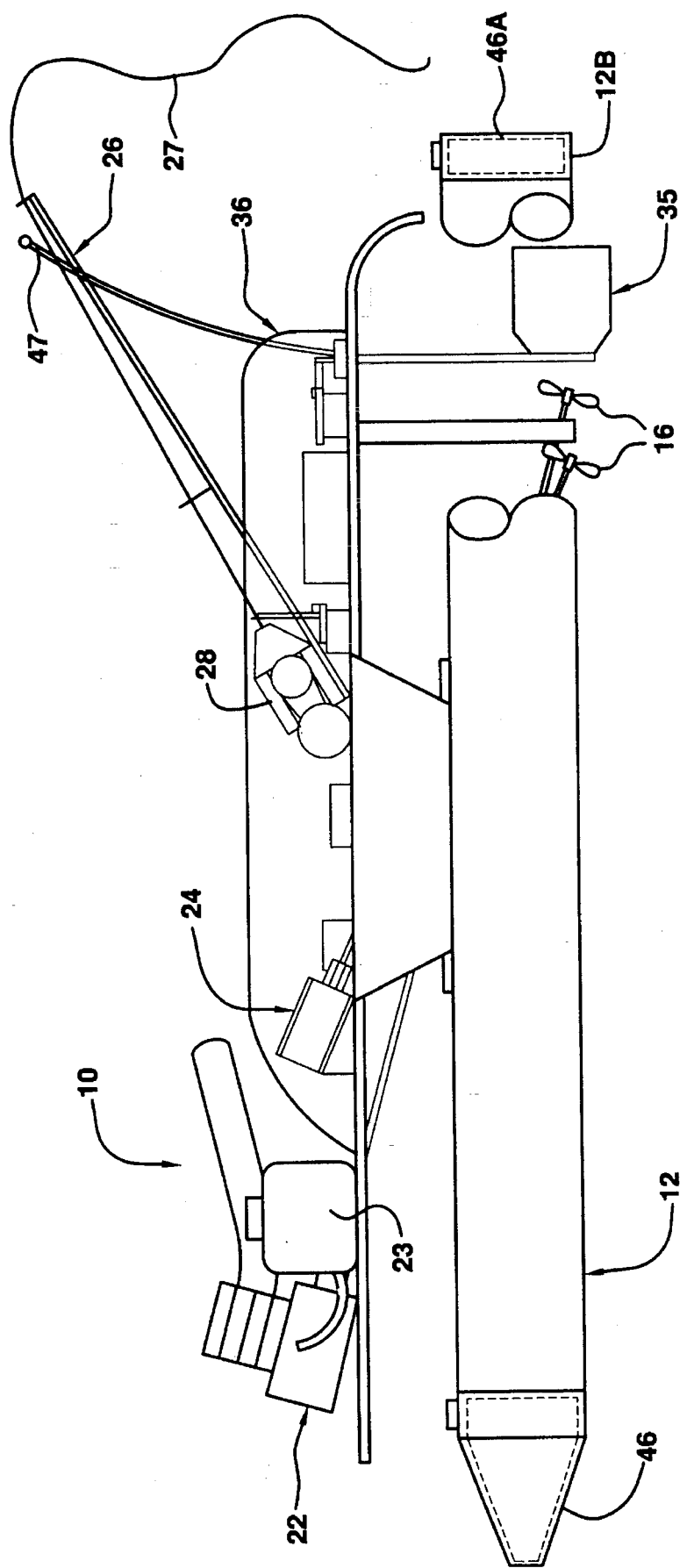

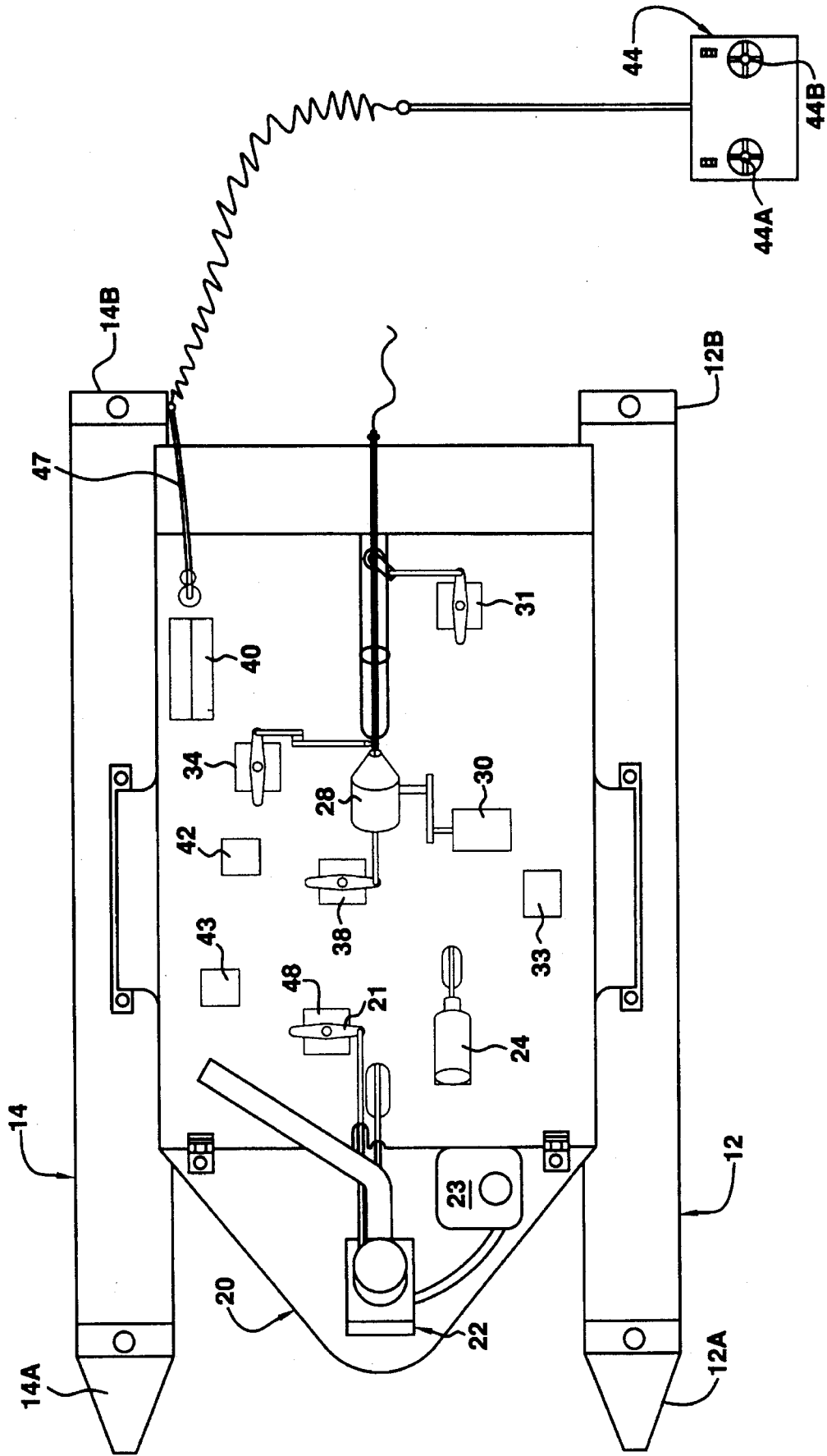

RADIO-CONTROLLED TROLLING VESSEL

FIELD OF THE INVENTION

This invention relates to fishing vessels. More particularly, this invention relates to remote-controlled fishing vessels. Even more particularly, this invention relates to remote-controlled trolling vessels.

BACKGROUND OF THE INVENTION

The use of self-propelled vessels for carrying a baited fishing line to remote locations has been previously proposed. See, for example, U.S. Pat. Nos. 4,442,621 (Kent); 4,161,077 (Ciaccio); 5,165,193 (Dankwardt); 3,613,284 (Anderson); 3,911,609 (Baya); and 5,154,016 (Fedora).

Each of said devices suffers from one or more disadvantages. For example, some of such devices do not include any means for remotely controlling the direction of movement of the vessel. Other of such devices do not include any means for automatically or remotely retrieving the fishing line. With some devices the fishing line must be detached from the vessel so that it can be reeled in from shore, or the vessel itself can be reeled in from shore.

Some remote controlled devices are intended to tow a fishing line and lure to a desired location where the line is released from the vessel. The opposite end of the line is held by the fisherman on the shore, for example. Also, some vessel devices utilize a tethering line to control movement of the vessel.

U.S. Pat. No. 4,890,409 (Morgan) describes a fishing boat which includes apparatus for operating a jig which can be raised or lowered by a cable. This is not a remote-controlled fishing vessel. U.S. Pat. No. 4,376,350 (Bednarz) describes an automatic down rigger control system for raising and lower a trolling line. This is not a description of a remote-controlled fishing vessel.

There has not heretofore been described a remote-controlled fishing vessel which is controlled by a fisherman from shore and which has the combination of features provided by the present invention.

SUMMARY OF THE PRESENT INVENTION

In accordance with the present invention there is provided a remotely-controlled trolling vessel which is very stable and which can be safely and easily controlled on water from a remote location (e.g., from shore). The trolling vessel includes a tubular flotation body on each side of a generally-horizontal platform which supports drive means (e.g., a gas engine or electric motor, or both). The platform also supports a fishing reel and remotely-controlled drive means for the reel so that the fishing line on the reel can be retrieved when desired. The platform also supports a remotely-controlled release mechanism that releases the fishing line, when that is desired.

The trolling vessel can be completely controlled from a remote location, such as from a shore or beach. There is no need for a tethered line from the operator to the vessel. The flotation pontoons on the vessel provide for very good flotation, ease of use, and excellent stability on the water. This enables the trolling vessel to remain upright even in rough water or when a large fish is caught on the line. The pontoon design also enables a large supply of fuel to be carried on the vessel, thereby enabling the vessel to be operated for an extended period of time. The pontoon design also enables any required ballast to be properly positioned on the vessel for best operation. In other words, depending upon the weight of the engine or motor (or both), the fishing reel, batteries, etc., the ballast can be adjusted so that the vessel is very stable on the water.

Preferably the vessel also includes line cutting means for selectively cutting the fishing line if the line should become snagged. The cutting means may be a knife which is moved between extended and retracted positions or it may comprise a wire which is heated by electricity until it becomes hot enough to melt through the fishing line.

Other advantages of the trolling vessel of the invention will become apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 2 is a side elevational view, partially cut away, of the vessel shown in FIG. 1; and FIG. 3 is a top view of the trolling vessel of FIG. 1.

DETAILED DESCRIPTION OF THE INVENTION

Figure 1:
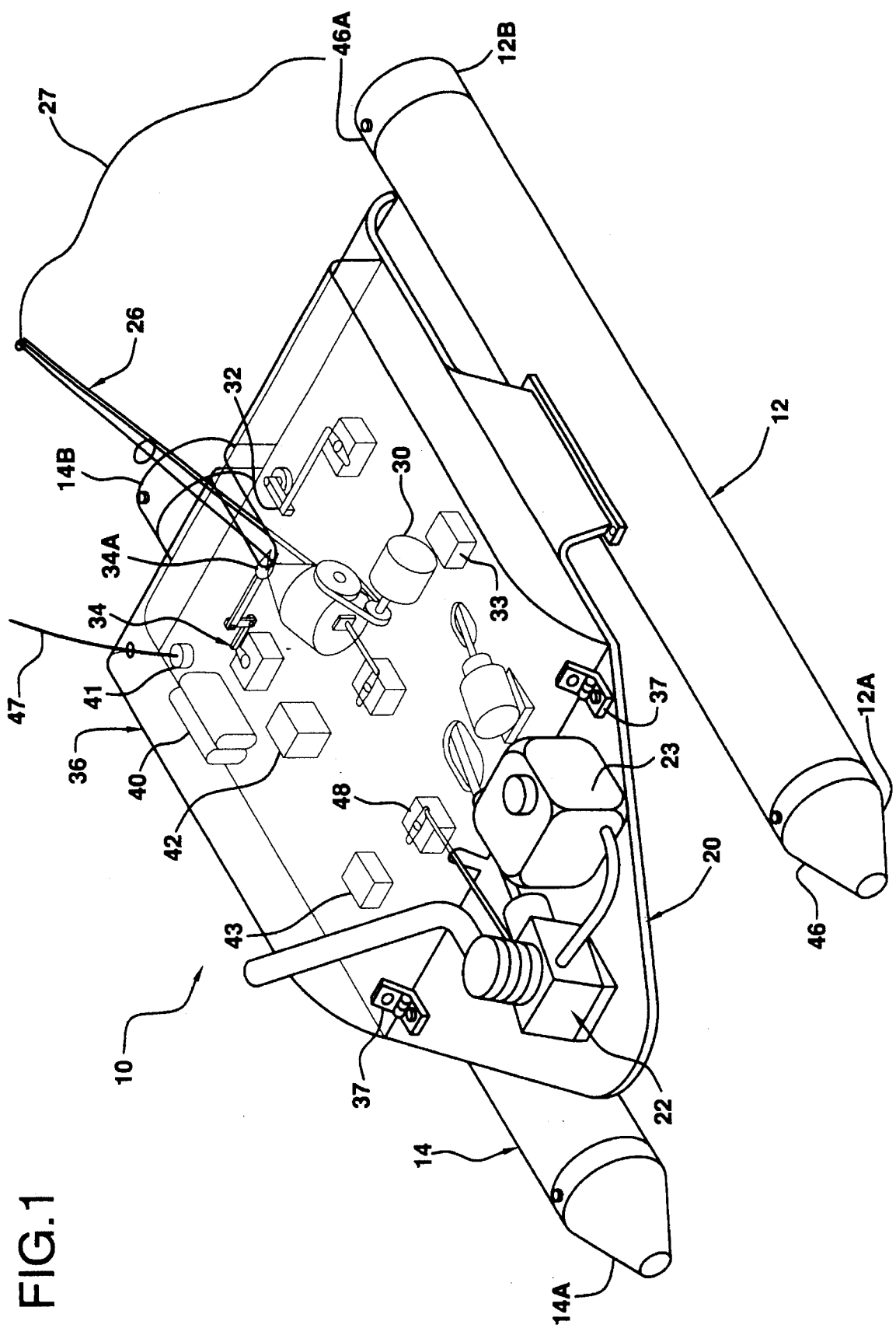
FIG. 1 is a perspective view of one embodiment of trolling vessel of the invention.

In the drawings there is shown a preferred embodiment of a remote-controlled fishing or trolling vessel 10 of the invention. The vessel includes two or more spaced-apart, parallel pontoons 12 and 14 which each have a bow end 12A (and 14A) and a stern end 12B (and 14B). One or more propellers 16 are carried by the vessel adjacent the stern end for propelling the vessel across the surface of the water. Preferably one propeller is powered by a gas engine 22 and another propeller is powered by an electric motor 24.

Between the portions, and supported by the pontoons, is a platform 20 which is preferably horizontal. On the platform there are secured the gas and electric motors, fuel supply 23, fishing rod 26, fishing reel 28, reel drive motor 30, rudder control means 32, electronic speed controllers 33 and 43, and line severing means 34A. Preferably a cover 36 encloses and protects the components carried on the platform. One end of the cover is preferably attached to the platform with hinges 37.

The rudder 35 at the stern is controlled by the rudder control means 32 to steer the vessel, as desired by the operator.

All electronic functions on board the vessel are controlled by the operator from shore through the use of a radio transmitter 44 and associated input control levers 44A and 44B. A radio antenna 47 and a radio receiver 42 are mounted on the platform 20 of the vessel. The antenna is anchored at its base to the platform. Batteries 40 for powering the electric motors 24 and 30 are carried on the platform. Battery 41 supplies power to receiver 42.

Through an input control on the radio transmitter held by the operator, a radio signal is sent to the antenna 47 and is then received through a first channel of the receiver 42 which is connected to the antenna. The first channel of the receiver 42 controls the servo mechanism 48 which operates a mechanical arm 21 attached to the throttle assembly of the gas engine 22. In this manner the speed of the vessel is controlled in a forward direction.

The operator can send another radio signal through antenna 47, and a second channel of receiver 42, to a servo mechanism 31 which operates rudder control means 32 (which is a mechanical arm attached to the rudder 35) for steering the vessel left or right.

The operator can send a third radio signal through antenna 47, and a third channel of receiver 42, to a servo mechanism 34 that operates a mechanical arm attached to a knife 34A. This enables the fishing line 27 to be severed when desired.

The operator can send another radio signal through antenna 47, and a fourth channel of receiver 42, to a servo mechanism 38 that operates a mechanical arm 39 activating the release mechanism inside reel 28, thereby allowing the fishing line to be released into the water, with the reel turning backwardly (i.e., in a direction of rotation opposite to that used to retrieve the fishing line.

The operator can send another radio signal through antenna 47, and a fifth channel of receiver 42, to the electronic speed controller 43 in order to activate the electric motor 24 which is attached to one of the propellers for driving the vessel through the water at a variable speed (or in a reverse direction) as desired by the operator.

The operator can send yet another radio signal through antenna 47, and a sixth channel of receiver 42, to the electronic speed controller 33 which activates the electric motor 30 to attached to the fishing reel 28. This arrangement enables the fishing line to be retrieved by the reel 28 at a variable speed, as desired by the operator.

In the apparatus shown in the drawings, the various servo mechanisms are electrically connected to and powered by the battery which supplies power to the receiver 42.

The fishing line 27 is wound around the fishing reel 28, and one end extends along the rod 26 and extends into the water (with an appropriate lure or baited hook on the free end of the line). The fishing line can be extended by causing the fishing reel to rotate in one direction, and the fishing line is caused to retract by causing the fishing reel rotate in the opposite direction. Electric motor 30 controls rotation of the fishing reel in the desired direction. Thus, when a fish strikes, the fishing line can be retrieved onto reel 28 by activating the motor 30 and causing it to rotate in the desired direction.

In the event that the fishing line should become snagged, it is possible to cut the line. For example, knife 34A can be caused to move across the fishing line to cut it. As another alternative, a heated element can be brought into contact with the line to melt it and cause it to break.

Other variants are possible without departing from the scope of this invention. For example, the tubular floats 12 and 14 can be moved forwardly or rearwardly relative to the platform in order to properly balance the vessel near the center of gravity. Also, the pontoons may include fuel cells 46 and 46A for additional fuel storage for operating the gas engine, or such compartments may be used instead for ballast, if desired.

What is claimed is:

1. A remotely-controlled trolling vessel comprising:
   (a) a pontoon flotation body having a bow end and a stern end;
   (b) propeller means carried by said flotation body adjacent said stern end for propelling said flotation body in water;
   (c) first power means comprising a gas engine for powering said propeller means;
   (d) rudder means for controlling the direction of movement of said flotation body in water;
   (e) fishing reel means supported on said flotation body and carrying a supply of fishing line;
   (f) reel drive means connected to said fishing reel means for driving said fishing reel means to retrieve said fishing line;
   (g) first control means on said flotation body for controlling operation of said power means upon receiving a first radio signal;
   (h) second control means on said flotation body for controlling operation of said reel drive means upon receiving a second radio signal;
   (i) line release means for enabling said reel means to turn backwardly to release said fishing line;
   (j) secondary power means comprising an electric motor for powering said propeller means; and
   (k) cutting means for cutting said fishing line.

2. A trolling vessel in accordance with claim 1, wherein said flotation body comprises two spaced-apart, elongated tubular floats having forward and rearward ends; wherein said forward ends are tapered; and further comprising a generally flat platform supported above said floats.

3. A trolling vessel in accordance with claim 2, wherein said first and secondary power means, said fishing reel means, and said reel drive means are supported on said platform.

4. A trolling vessel in accordance with claim 2, wherein said tubular floats comprise fuel storage cells.

5. A trolling vessel in accordance with claim 2, further comprising cover means covering said platform.

6. A trolling vessel in accordance with claim 1, wherein said cutting means comprises a knife which is movable between extended and retracted positions.

7. A trolling vessel in accordance with claim 1, wherein said cutting means comprises a wire connected to a battery; wherein said wire becomes heated to cut said fishing line when said electricity from said battery passes through said wire.

8. A remotely-controlled trolling vessel comprising:
   (a) a pontoon flotation body having a bow end and a stern end; wherein said flotation body comprises two spaced-apart, elongated tubular floats having forward and rearward ends; wherein said forward ends are tapered; and further comprising a generally flat platform supported above said floats.
   (b) propeller means carried by said flotation body adjacent said stern end for propelling said flotation body in water;
   (c) first power means comprising a gas engine for powering said propeller means;
   (d) rudder means for controlling the direction of movement of said flotation body in water;
   (e) fishing reel means supported on said flotation body and carrying a supply of fishing line;
   (f) reel drive means connected to said fishing reel means for driving said fishing reel means to retrieve said fishing line;
   (g) first control means on said flotation body for controlling operation of said power means upon receiving a first radio signal;
   (h) second control means on said flotation body for controlling operation of said reel drive means upon receiving a second radio signal; and
   (i) line release means for enabling said reel means to turn backwardly to release said fishing line;

(j) secondary power means comprising an electric motor for powering said propeller means; and (k) cutting means for cutting said fishing line.

9. A trolling vessel in accordance with claim 8, wherein power means, said fishing reel means, and said reel drive means are supported on said platform.

10. A trolling vessel in accordance with claim 8, wherein said tubular floats comprise fuel storage cells.

* * * * *